US011950600B2

(12) United States Patent
Ferrari et al.

(10) Patent No.: US 11,950,600 B2
(45) Date of Patent: Apr. 9, 2024

(54) PROCESS FOR THE PRODUCTION OF A READY TO EAT SHELF-STABLE PACKAGED FOCACCIA

(71) Applicant: BARILLA G. E R. FRATELLI S.P.A., Parma (IT)

(72) Inventors: Corrado Ferrari, Parma (IT); Cristina Gallina, Parma (IT); Alessandro Ruggeri, Parma (IT)

(73) Assignee: BARILLA G. E R. FRATELLI S.P.A., Parma (IT)

( * ) Notice: Subject to any disclaimer, the term of this patent is extended or adjusted under 35 U.S.C. 154(b) by 151 days.

(21) Appl. No.: 17/507,095

(22) Filed: Oct. 21, 2021

(65) Prior Publication Data
US 2022/0039405 A1    Feb. 10, 2022

Related U.S. Application Data

(62) Division of application No. 15/305,175, filed as application No. PCT/EP2015/059416 on Apr. 29, 2015, now abandoned.

(30) Foreign Application Priority Data
May 8, 2014    (EP) ..................................... 14425055

(51) Int. Cl.
*A21D 13/22* (2017.01)
*A21D 13/40* (2017.01)
*A21D 13/43* (2017.01)

(52) U.S. Cl.
CPC ............. *A21D 13/22* (2017.01); *A21D 13/40* (2017.01); *A21D 13/43* (2017.01)

(58) Field of Classification Search
None
See application file for complete search history.

(56) References Cited

U.S. PATENT DOCUMENTS

| 4,842,882 A | * | 6/1989 | Paulucci | ................ A21D 13/41 |
| | | | | 426/94 |
| 5,059,432 A | | 10/1991 | Berkowitz et al. | |

(Continued)

FOREIGN PATENT DOCUMENTS

| EP | 0 104 742 | 4/1984 |
| JP | 59-135829 | 8/1984 |

OTHER PUBLICATIONS

The Fresh Loaf, Jun. 27, 2009.*
International Search Report dated Jun. 25, 2015 in International (PCT) Application No. PCT/EP2015/059416.

(Continued)

*Primary Examiner* — Lien T Tran
(74) *Attorney, Agent, or Firm* — Wenderoth, Lind & Ponack, L.L.P.

(57) ABSTRACT

A shelf-stable ready-to-eat packaged focaccia, is described having appearance and organoleptic qualities comparable to those of a fresh focaccia, which has a relative humidity comprised between 25 and 32%, preferably 27% and water activity ($a_w$) comprised between 0.85 and 0.92, preferably 0.89, and blind holes on its surface having depth of at least 50% of the thickness of the focaccia. A process for the production of a ready-to-eat shelf-stable packaged focaccia is also described which comprises the steps of: a) preparing a dough for focaccia comprising, by weight based on the total weight of the dough, 40-60% flour, 20-35% water, 7-16% vegetable oils and/or fats and/or fractions thereof, of which 1-6% extra virgin olive oil, 0.5-4% yeast, 0.1-3% salt, 0-15% at least one organoleptically characterising ingredient; 0-0.1% at least one baking processing aid, 0-0.8% at least one emulsifier and 0-1.5% dietary fibres; b) extrusion of the dough thus prepared thus obtaining a plurality of sheets of extruded raw dough for focaccia, and subsequent lamination of the plurality of sheets of raw dough for focaccia thus obtaining a layer of laminated raw dough for focaccia; c) first leavening of the layer of laminated raw (Continued)

dough for focaccia thus obtained at a temperature comprised between 20 and 30° C.; d) shaping of the layer of leavened raw dough for focaccia thus obtained forming a plurality of blind holes on the surface of the dough and filling of the holes with a saline solution; e) second leavening of the raw dough thus obtained at a temperature comprised between 30 and 37° C.; f) oiling of the upper surface of the dough thus obtained with filling with the oil of said holes; g) baking of the raw dough thus obtained in an oven at a temperature comprised between 210 and 240° C.; and h) packaging of the focaccia thus obtained.

13 Claims, 2 Drawing Sheets

(56) References Cited

U.S. PATENT DOCUMENTS

| 2002/0136814 A1 | 9/2002 | Forneck et al. |
| 2004/0086601 A1 | 5/2004 | Ross et al. |
| 2007/0207240 A1 | 9/2007 | Hansen et al. |

OTHER PUBLICATIONS

"Garlic Focaccia Bread", Mintel, www.gnpd.com, Aug. 2013, 2 pages, XP-002729481.
"Focaccia Rolls", Mintel, www.gnpd.com, Dec. 2004, 2 pages, XP-002729482.
"Genova style focaccia", https://nerodiseppiaenglish.wordpress.com/2011/10/26/genova-style-focaccia/, accessed on Jan. 18, 2019, in corresponding Japanese Application No. 2017-510746.

* cited by examiner

PROCESS FOR THE PRODUCTION OF A READY TO EAT SHELF-STABLE PACKAGED FOCACCIA

This application is a divisional of application Ser. No. 15/305,175 filed on Oct. 19, 2016, Now Abandon

FIELD OF APPLICATION

The present invention relates to the technical area of the food industry and relates, in particular, to a ready-to-eat shelf-stable packaged focaccia. The present invention also relates to a process for the production of a ready-to-eat shelf-stable packaged focaccia.

PRIOR ART

Focaccia is a typical Italian bakery product obtained from the processing of a dough of soft wheat flour, water, extra virgin olive oil, yeast and salt, which is leavened and subsequently baked in an oven in an iron baking tray having a very low edge. The focaccia usually has a rectangular shape but can also be circular in shape.

According to some recipes, the focaccia can also be flavoured with various ingredients, more traditionally onions, tomatoes, olives, rosemary, cheese and/or other ingredients, according to taste, which are incorporated in the kneading and/or lamination steps and/or placed on the surface of the focaccia.

The focaccia is different from bread in that it is substantially flat, of small thickness (in general the thickness does not exceed two-three centimetres) and with an upper surface that is slightly oily and golden brown in colour. The upper surface typically exhibits a plurality of blind holes (or dimples) arranged more or less regularly over the entire surface. Typically, these holes are characterised in that they are more browned (therefore darker) on the surface and lighter at the base and in that they contain traces of oil.

The traditional focaccia is also characterised in that, upon tasting, a contrast of flavour is perceived between the areas in which the surface is higher in salt and those in which it is poorer in salt, a contrast created by the presence on the surface of grains of salt, which confers an uneven salting of the surface.

Focaccia is a food which is traditionally eaten not only as a main dish but, depending on the portion, also as a snack between meals.

Processes for the preparation of fresh focaccia have long been known.

The dough for a plain fresh focaccia comprises usually soft wheat flour, water, extra virgin olive oil, yeast and salt. After mixing of the ingredients together, the dough ball is left to rest for at least 30 minutes at a temperature of 30-35° C. The dough is then flattened out (optionally after a lamination and/or filling step) on a baking tray previously oiled with extra virgin olive oil and is brushed with oil on the surface of the dough. The surface is then scattered with coarse salt and the dough is then pressed with the fingertips, obtaining blind holes. The dough is then again leavened and finally the baking tray is placed in the oven at 200-230° C. for 9-15 minutes.

Of course, there are many variations to this process which can comprise further leavening periods, with different times and temperatures and with different times and temperatures of baking. There is also a wide variability in the choice of the quantities of the ingredients and of the seasoning or filling.

Fresh focaccia, according to the adopted process, may be variably thick, crispy, browned, filled/seasoned and salted, according to taste. The aforesaid holes, typical of focaccia, may also be more or less visible, depending on the adopted process.

One characteristic of fresh focaccia is the fact that its shelf life, generally, is not longer than 24 hours. Already a few hours after coming out of the oven, in fact, the focaccia undergoes a gradual migration of the humidity which reduces its fragrance and makes the structure chewy (and subsequently dry). Moreover the oil undergoes a deterioration in quality which causes a loss of fragrance. This type of focaccia is therefore suitable for being sold and served only fresh, either hot or cold.

Of course, this imposes a limit in that it has to be purchased or prepared only a few hours prior to consumption.

In an attempt to overcome this limit, and make available a longer-lasting focaccia, which can be purchased days, even months, before its consumption, the food industry has devised various solutions, such as for example that of making available, both for catering and for sale in supermarkets, half-baked focaccias, packaged in modified atmosphere and refrigerated or frozen baked or half-baked focaccias.

In the case of the refrigerated or frozen product, the prolonged freshness over time is obviously guaranteed by the low storage temperatures. On the other hand, in the case of the half-baked product stored for example in modified atmosphere, or under vacuum, the preservation at ambient temperature of the focaccia is guaranteed by the very modified atmosphere (or vacuum) and it can therefore be stored at ambient temperature.

These products mentioned above have the advantage of allowing the consumer to purchase and store the focaccia at home also for long periods of time prior to its consumption, so as to have it available when needed.

However these products require a baking step or at least a defrosting/heating step by the consumer or caterer, to complete their preparation, shortly before consumption. Once this latter step of preparation has been completed, in fact, the focaccia will have a keeping time comparable to that of a fresh focaccia.

As a consequence, these products impose yet another limitation with respect to the convenience of being able to have at one's disposal a focaccia ready for consumption at any time, in particular when an equipped kitchen is not available, for example in a work environment or when travelling.

From the database GNPD [Online] MINTEL (database accession number 2144781; August 2013) it is known a "garlic focaccia bread", produced by the Australian company Quattro's Bakehouse & Fine Foods, which is "suitable for preparing snacks or for lunches, and can be sliced, filled and toasted". This product must be stored in a chilled condition and thus is not shelf-stable.

The database GNPD [Online] MINTEL (database accession number 321662; December 2004) discloses "Focaccia Rolls", which are described as "delicious Italian style white soft bread made with extra virgin olive oil (3.5% b.w.) and topped with oregano". This product, due to its low content of extra virgin olive oil and also to its low overall content of fats (9.4% b.w.), cannot be considered as comparable to a traditional, fresh "focaccia". Moreover, this product contains 4% b.w. of sugars, whereas traditional focaccia does not contain sugars.

The need is therefore felt to make available a shelf-stable focaccia at ambient temperature, that is ready to eat, which has optimal appearance and organoleptic qualities, comparable to those of a fresh focaccia.

The technical problem at the basis of the present invention is therefore that of making available a packaged focaccia having the appearance and organoleptic qualities comparable to those of a fresh focaccia, which has long shelf life at ambient temperature, and which at the same time is ready to eat, i.e. does not need any treatment in order to finish off its preparation prior to consumption.

SUMMARY OF THE INVENTION

The technical problem disclosed above has therefore been solved by making available a packaged shelf-stable ready-to-eat focaccia, having appearance and organoleptic qualities comparable to those of a fresh focaccia, which contains extra virgin olive oil in a quantity of at least 6% by weight based on the final weight of the focaccia and exhibits a relative humidity comprised between 25 and 32%, preferably comprised between 26% and 29%, more preferably 27%, and water activity ($a_w$) comprised between 0.85 and 0.92, preferably comprised between 0.87 and 0.91, more preferably 0.89, and blind holes on its surface having depth of at least 50% of the thickness of the focaccia.

The focaccia of the invention is substantially flat in appearance, with a substantially level upper surface which exhibits blind holes (also referred to as dimples or wells) distributed substantially homogenously on the surface of the focaccia, preferably at a distance of approximately 2 cm from each other, and with a continuous base.

Preferably the depth of the aforesaid holes is at least 70%, more preferably at least 90%, even more preferably at least 95% of the thickness of the focaccia.

Preferably the thickness of the focaccia is comprised between 15 and 35 mm with holes of depth comprised between 10 and 33 mm.

Preferably the aforesaid holes exhibit traces of salt and/or oil inside.

The upper surface of the focaccia appears preferably lightly oily.

Advantageously in the focaccia of the present invention, relative humidity and water activity are substantially homogeneous across the focaccia. That is to say that, for example, the focaccia of the invention does not exhibit a crispy surface, or having the edges crispier than the centre.

Preferably the focaccia comprises, by weight based on the final weight of the focaccia, flour in a quantity comprised between 50 and 60%, preferably comprised between 53 and 58%, more preferably about 56%; vegetable fats and/or oils and/or fractions thereof in a quantity comprised between 12 and 20%, preferably about 17%, of which extra virgin olive oil in a quantity comprised between 6 and 10%, preferably about 9%; yeast in a quantity comprised between 2 and 4%, preferably about 3%; salt in a quantity comprised between 1.0 and 2.3%, preferably about 2%, at least one organoleptically characterising ingredient in a quantity comprised between 0 and 15%; at least one baking processing aid in a quantity comprised between 0 and 0.1%; at least one emulsifier in a quantity comprised between 0 and 0.8%; and dietary fibres in a quantity comprised between 0 and 1.5%.

This flour can be selected from any cereal flour, preferably in the group consisting of durum wheat, soft wheat, turanicum wheat (*Triticum turgidum* ssp. *Turanicum*), rye, corn, rice, spelt, barley, sorghum, millet, oats, triticale, buckwheat, quinoa, and mixtures thereof, even more preferably soft wheat flour.

Preferably such vegetable fats and/or oils and/or fractions thereof are selected in the group consisting of palm, olive, sunflower, high oleic sunflower, canola oils and/or fats, and combinations thereof, more preferably a mixture of extra virgin olive oil and palm fat and/or vegetable margarine.

Preferably the focaccia of the present invention comprises a quantity of extra virgin olive oil comprised between 6 and 10% and a quantity of palm fat and/or vegetable margarine comprised between 6 and 10%.

Preferably the focaccia of the present invention comprises 9% of extra virgin olive oil and 8% of palm fat and/or vegetable margarine.

Preferably the yeast is natural yeast, more preferably natural yeast and natural yeast starter, the latter being preferably powdered. The latter in fact contributes to conferring to the focaccia of the invention a better taste.

Preferably the organoleptically characterising ingredient, if present, is present in a quantity comprised between 5 and 15%.

The optional presence of processing aid, emulsifiers and/or dietary fibres has the purpose of contributing to the preservation of the softness of the focaccia during its storage.

The baking processing aid is preferably present in a quantity comprised between 0.02 and 0.1%, the emulsifier is present in a quantity comprised between 0.2 and 0.8% and the dietary fibres are present in a quantity comprised between 0.5 and 1.5%.

The baking processing aid is preferably an ascorbic acid and/or enzyme-based baking improver.

The emulsifier is preferably chosen from among fatty acid mono- and diglycerides and/or lecithin.

The dietary fibres are preferably chosen in the group consisting of guar fibres, wheat fibres, sugar beet fibres, or combinations thereof, preferably guar fibres. The presence of the dietary fibres enables in fact to obtain a dough with relatively high water content without jeopardising the rheology of the dough itself.

The organoleptically characterising ingredient is preferably found in the focaccia according to the invention in one or a combination of the following ways: substantially homogenously distributed both on the surface and in the entire thickness of the focaccia, placed mainly inside the focaccia, and/or placed on the upper surface of the focaccia.

According to a first preferred embodiment the focaccia consists, by weight based on the final weight of the focaccia, of flour in a quantity comprised between 50 and 60%, preferably comprised between 53 and 58%, more preferably about 56%; vegetable fats and/or oils and/or fractions thereof in a quantity comprised between 12 and 20%, preferably about 17%, of which extra virgin olive oil in a quantity comprised between 6 and 10%, preferably about 9%; yeast in a quantity comprised between 2 and 4%, preferably about 3%; salt in a quantity comprised between 1.0 and 2.3%, preferably about 2%; at least one baking processing aid in a quantity comprised between 0% and 0.1%; at least one emulsifier in a quantity comprised between 0 and 0.8%; dietary fibres in a quantity comprised between 0 and 1.5%; and water to 100%.

In this first embodiment the focaccia is referred to as plain, and with this term it is meant that there is no organoleptically characterising ingredient as defined here.

According to a second preferred embodiment, the focaccia comprises one or more organoleptically characterising ingredients substantially homogeneously distributed both on the surface and in its entire thickness in a quantity comprised between 5 and 15%, preferably 8-13%, more preferably about 11% by weight based on the total weight of the dough.

This organoleptically characterising ingredient is preferably olives, more preferably stoned and fragmented black olives.

According to a third preferred embodiment, the focaccia comprises one or more organoleptically characterising ingredients placed mainly inside the focaccia, in a quantity comprised between 5 and 15%, preferably 7-10%, more preferably about 8% by weight based on the total weight of the dough.

This organoleptically characterising ingredient is preferably tomato, more preferably osmotically dehydrated and fragmented cherry tomato.

In the second and third embodiments the focaccia is referred to as flavoured.

Optionally the flavoured focaccias of the invention also contemplate the presence of at least one organoleptically characterising ingredient on the upper surface of the focaccia.

In the present invention the term organoleptically characterising ingredient refers to an ingredient characterising the taste and the appearance of the finished focaccia.

The organoleptically characterising ingredient is preferably chosen in the group consisting of vegetables, fruits, spices and aromatic herbs, cheeses, meats, fish, cereal grains or combinations thereof.

Examples of organoleptically characterising ingredients are vegetables, such as olives, tomatoes, peppers, onions, aubergines, courgettes, capers; herbs and spices such as rosemary, basil, parsley, chilli pepper; cheese; meats such as ham, salami, lard, mortadella; fish such as anchovies, salmon; vegetable based sauces such as tomato sauce, pesto and similar preparations.

The upper surface of the focaccia has a golden-brown (hazelnut colour) appearance, lighter (white-ivory colour) inside the holes. The colour was measured by means of the photographic visual method, for example with digital photography with comparison method, as will be explained more clearly in the detailed description of the invention.

The focaccia is soft but not chewy. Advantageously the focaccia of the invention exhibits a resistance to compression comprised between 4 and 8N, preferably about 6N measured with SMS Texture Analyser Dynamometer, as will be explained more clearly in the detailed description of the invention.

The focaccia has a regular cell structure in which preferably between 55 and 80% of the cells have sizes comprised between 10 and 100 pixels. The sizes and shape of the cells were characterised by means of image analysis, as will be explained more clearly in the detailed description of the invention.

The focaccia is preferably packaged in a packaging of the type with metallised film having light and air barrier properties, for example plastic multipack, optionally inserted in turn in a cardboard packaging (box).

An example of such barrier metallised films is the SMML film marketed by Manucor, and similar films, also double layered, which has a water vapour transmission rate ($g/m^2/24\ h$) of 1 and an oxygen transmission rate ($g/m^2/24\ h$) of 10.

The focaccia of the present invention preferably has a shelf life of at least 60 days, more preferably at least 90 days, even more preferably a period of at least 120 days.

The technical problem stated above was also solved by making available a process for the production of a ready-to-eat shelf-stable packaged focaccia having relative humidity comprised between 25 and 32%, preferably 27%, and water activity ($a_w$) comprised between 0.85 and 0.92, preferably 0.89, which process comprises the steps of:

a) preparation of a dough for focaccia comprising, by weight based on the total weight of the dough, 40-60% flour, 20-35% water, 7-16% vegetable oils and/or fats and/or fractions thereof, of which 1-6% extra virgin olive oil, 0.5-4% yeast, 0.1-3% salt, 0-15% at least one organoleptically characterising ingredient; 0-0.1% at least one baking processing aid, 0-0.8% at least one emulsifier and/or 0-1.5% dietary fibres;

b) extrusion of the dough thus prepared thus obtaining a plurality of sheets of extruded raw dough for focaccia, and subsequent lamination of such plurality of sheets of raw dough for focaccia thus obtaining a layer of laminated raw dough for focaccia;

c) first leavening of the layer of laminated raw dough for focaccia thus obtained at a temperature comprised between 20 and 30° C.;

d) shaping of the layer of leavened raw dough for focaccia thus obtained forming a plurality of blind holes on the surface of the dough and filling of said holes with a saline solution;

e) second leavening of the raw dough thus obtained at a temperature comprised between 30 and 37° C.;

f) oiling of the upper surface of the dough thus obtained with filling with oil of the holes;

g) baking of the raw dough thus obtained in an oven at a temperature comprised between 210 and 240° C.;

h) packaging of the focaccia thus obtained.

In step a) the flour can be selected from any cereal flour, preferably in the group consisting of durum wheat, soft wheat, turanicum wheat (*Triticum turgidum* ssp. *turanicum*), rye, corn, rice, spelt, barley, sorghum, millet, oats, triticale, buckwheat, quinoa, and mixtures thereof, even more preferably soft wheat flour.

Preferably in step a) such vegetable fats and/or oils and/or fractions thereof are selected in the group consisting of palm, olive, sunflower, high oleic sunflower, canola oils and/or fats, or combinations thereof, more preferably a mixture of extra virgin olive oil and palm fat and/or vegetable margarine.

Preferably step a) of kneading involves the mixing of a quantity of extra virgin olive oil comprised between 1 and 6% and a quantity of palm fat and/or vegetable margarine comprised between 6 and 10%.

The optional presence of processing aid, emulsifiers and/or dietary fibres has the purpose of contributing to the preservation of the softness of the focaccia during its shelf life.

The at least one baking processing aid is preferably present by weight based on the total weight of the dough in a quantity comprised between 0.02 and 0.1%, the at least one emulsifier in a quantity comprised between 0.2 and 0.8%; and the dietary fibres in a quantity comprised between 0.5 and 1.5%.

The baking processing aid is preferably an ascorbic acid and/or enzyme-based baking improver.

The emulsifier is preferably chosen from among fatty acid mono- and diglycerides and/or lecithin.

The dietary fibres are preferably chosen in the group consisting of guar fibres, wheat fibres, sugar beet fibres, preferably guar fibres.

Preferably the yeast is natural yeast, more preferably natural yeast and natural yeast starter, the latter being preferably powdered.

The organoleptically characterising ingredient of step a) of kneading is preferably chosen in the group consisting of vegetables, fruits, spices and aromatic herbs, cheeses, meats, fish, cereal grains and combinations thereof, preferably black olives, more preferably stoned and fragmented frozen black olives.

Examples of organoleptically characterising ingredients are moreover vegetables, such as olives, tomatoes, peppers, onions, aubergines, courgettes, capers; herbs and spices such as rosemary, basil, parsley, chilli pepper; cheeses; meats such as ham, salami, lard, mortadella; fish such as anchovies, salmon; vegetable-based sauces such as tomato sauce, pesto and similar preparations.

Preferably the at least one characterising ingredient of step a) is present in a quantity comprised between 5 and 15%, more preferably 8-13%, even more preferably 11% by weight based on the total weight of the dough.

The preparation of the dough is preferably carried out by means of a spiral mixer.

Preferably step a) of kneading comprises a first step in which the flour, the water, the optional at least one baking processing aid, at least one emulsifier and/or dietary fibres and the optional at least one organoleptically characterising ingredient are mixed, more preferably in a spiral mixer, preferably for a time comprised between 3 and 6 minutes at 20-50 rpm; and a second step in which the vegetable oils and/or fats and/or fractions thereof, the yeast and the salt are introduced into the dough thus formed, preferably for a time comprised between 3 and 10 minutes at 50-90 rpm.

The dough obtained from step a) of kneading is preferably at a temperature comprised between 15 and 19° C., preferably about 17.5° C.

Preferably step b) of extrusion and lamination is carried out with a passage of the dough in a "stress free" roller extruder thus obtaining a continuous layer of extruded raw dough, followed by the passage of the layer of extruded raw dough through a series of calibration rollers thus obtaining a sheet of extruded raw dough.

More particularly step b) of extrusion and lamination is preferably carried out with a "stress free" process (i.e. without mechanical damaging) with passage of the dough in a "stress free" roller extruder, for example a model V4 extruder produced by Rheon Japan, thus obtaining a continuous layer of extruded raw dough, preferably having a thickness comprised between 30 and 40 mm, more preferably of about 35 mm and having width preferably comprised between 350 and 450 mm, more preferably about 400 mm. Such layer of extruded raw dough is then passed in a series of calibration rollers, for example by means either of a multi-roller apparatus or a single pair of rollers apparatus, for example the multi-roller "stretcher" apparatus produced by Rheon Japan, thus obtaining a sheet of extruded raw dough having a thickness preferably comprised between 6 and 9 mm, more preferably about 8 mm and a width preferably comprised between 750 and 1400 mm, more preferably about 800 mm.

Preferably step b) of extrusion and lamination involves preferably the overlaying of from 2 to 8 sheets of extruded raw dough, even more preferably 4, thus obtaining, preferably, of a layer of laminated raw dough for focaccia having total thickness of 4-7 mm, more preferably about 5 mm.

Preferably said step b) of extrusion and lamination comprises a step of dosage of at least one organoleptically characterising ingredient in a quantity comprised between 0 and 15% between two sheets of extruded raw dough for focaccia.

Preferably the organoleptically characterising ingredient of step b) is chosen in the group consisting of vegetables, fruits, spices and aromatic herbs, cheeses, meats, fish, cereal grains and combinations thereof, more preferably tomato.

The tomato is preferably osmotically dehydrated cherry tomato.

Examples of organoleptically characterising ingredients are moreover vegetables, such as olives, tomatoes, peppers, onions, aubergines, courgettes, capers; herbs and spices such as rosemary, basil, parsley, chilli pepper; cheeses; meats such as ham, salami, lard, mortadella; fish such as anchovies, salmon; vegetable-based sauces such as tomato sauce, pesto and similar preparations.

Preferably the at least one characterising ingredient of step b) is present in a quantity comprised between 5 and 15%, more preferably 7-10%, even more preferably 8% by weight based on the total weight of the dough.

Preferably such step b) of extrusion and lamination is followed by a step of portioning of the layer of raw dough for focaccia obtained in step b), preferably in portions of dough weighing 2.5-3.0 kg, and preferably by the placing in the baking tray of the layer of portioned raw dough for focaccia.

Preferably the baking tray is of the Teflon-coated type and rectangular in shape, segmented, with edges along the four sides and with depth comprised between 20 and 30 mm, preferably about 25 mm.

In a preferred embodiment each baking tray is suitable for containing about 2.5-3 kg of dough.

Preferably step c) of first leavening is carried out for a time comprised between 25 and 35 minutes, at a temperature comprised between 20 and 30° C., at a relative humidity comprised between 55 and 65%.

Preferably step c) of first leavening is carried out at a temperature of about 25° C. for about 30 minutes at a relative humidity of about 60%.

Optionally, step c) of first leavening is followed by a step of adding on the surface of one or more organoleptically characterising ingredients at any time before the step g) of baking.

The step d) of shaping is carried out preferably by means of incision of the dough by means of a plurality of cylinders, preferably supported on a plate which, in action, moves in a perpendicular direction above the surface of the dough. These cylinders are preferably made in plastic material, for example Teflon or Arnite.

Shaping here refers to the formation on the upper surface of the raw dough for focaccia of blind holes having depth of at least 70% of the thickness of the dough for focaccia. In other words, in the dough for focaccia blind holes are formed which extend from the top downwards for at least 70% of the thickness, while up to a thickness of 30% of the dough for focaccia at the base can be unaffected by the shaping holes.

This operation, which in the process of preparation of the traditional fresh focaccia is performed by pressure of the fingers of the hands, is in the process of the present invention carried out by means of an apparatus set up ad hoc which has a series of cylinders placed at a substantially homogeneous distance one from the other and which each have a diameter of about 1.0 cm which poke the upper surface of the dough and subsequently withdraw from the dough so as to leave a plurality of blind holes on the surface of the dough, comparable to those which traditionally are performed with pressure of the fingers of the hands.

Preferably the saline solution comprises from 25% by weight of salt based on the volume of the solution to saturation, more preferably said saline solution is saturated and comprises about 35% by weight of salt based on the volume of the solution. The solution may optionally comprise other additional ingredients such as herbs, spices or other similar ingredients.

The filling of the holes in step d) of shaping preferably consists of placing approximately 0.05-0.5 g, more preferably 0.1 g, of saline solution in each hole.

Preferably step e) of second leavening is carried out for 80-130 minutes, at a temperature comprised between 30 and 37° C., at a relative humidity comprised between 80 and 95%.

Preferably step e) of second leavening is carried out at a temperature of about 32° C. approximately for about 100 minutes at a relative humidity of 85%.

Preferably, in step f) of oiling the surface, the quantity of oil is 3-8% by weight based on the weight of the dough, more preferably the oil being extra virgin olive oil, even more preferably in such a quantity as to bring the total content of extra virgin olive oil to 9% by weight based on the weight of the dough.

Preferably, in said step g) of baking, the oven is of the convection type and the baking is more preferably carried out for a time comprised between 13 and 19 minutes, at an average temperature comprised between 210 and 240° C.

Preferably, in step g) of baking, the oven is of the convection type and the baking is more preferably carried out at an average temperature of about 215° C. for approximately 14 minutes.

Preferably, at the end of step g) of baking the thickness of the baked focaccia is 15-35 mm, more preferably about 25 mm. The shaping holes preferably exhibit a depth comprised between 14 and 33 mm, more preferably 24 mm.

Preferably, at the end of step g) of baking, the removal of the focaccia thus obtained from the baking tray within two minutes from exiting the oven, the transfer of the focaccia onto a baking rack and the subsequent cooling are carried out.

Preferably, the cooling takes place in a controlled atmosphere under overpressure filtered air for the time required for reaching a temperature of about 30° C.

The step h) of packaging preferably comprises a step of portioning.

Preferably, during the step of portioning, the focaccia is cut with a system chosen from among ultrasounds, circular blade and serrated knife, more preferably ultrasounds.

In a preferred embodiment, in step h) of packaging the focaccia is cut into portions of focaccia weighing 33-35 g and measuring 71×97×25 mm.

In another preferred embodiment, in step h) of packaging the focaccia is cut into portions of focaccia weighing 200 g and measuring 167×219×27 mm.

In a further preferred embodiment, in step h) of packaging the focaccia is cut into portions of focaccia weighing 180 g and measuring 167×213×27 mm.

In a further preferred embodiment, in step h) of packaging the focaccia is cut into portions of focaccia weighing 350 g and measuring 210×210×30 mm.

In a further preferred embodiment, in step h) of packaging the focaccia is cut into a round or oval shape.

Preferably, before packaging, ethyl alcohol is sprayed or dripped onto the focaccia in a quantity comprised between 0.75 and 1.5%, more preferably about 1.4% on a wet basis.

Preferably, in step h) of packaging, the focaccia obtained is inserted in a packaging of the type with metallised film having light and air barrier properties, for example plastic multipack, optionally inserted in turn in a cardboard packaging (box).

In a first preferred embodiment of the invention the process does not comprise in step a) of kneading the presence of the at least one organoleptically characterising ingredient as defined here. In this case a plain focaccia is obtained.

In a second preferred embodiment of the invention the process comprises in step a) of kneading the presence of an organoleptically characterising ingredient and does not comprise the dosing of the at least one organoleptically characterising ingredient as defined here in step b) of extrusion and lamination of the dough.

The organoleptically characterising ingredient of step a) is preferably olives, more preferably frozen, stoned and fragmented olives. In this case a flavoured focaccia is obtained.

In a third preferred embodiment the process does not comprise in step a) of kneading the presence of the at least one organoleptically characterising ingredient as defined here and comprises in step b) of extrusion and lamination of the dough a step of dosing of an organoleptically characterising ingredient between two sheets of dough. The organoleptically characterising ingredient of step b) is preferably tomato, more preferably osmotically dehydrated and fragmented cherry tomato. In this case also, a flavoured focaccia is obtained.

The term focaccia refers here to a bakery product obtained from the processing of a dough which comprises flour, water, vegetable oils and/or fats and/or fractions thereof, leavened and subsequently baked, which has a thickness of at least about 15 mm and which has an upper surface browned in colour with shaping holes having a depth of at least 50% of the thickness of the focaccia. Upon tasting, the focaccia exhibits a contrast in the perception of the salted flavour caused by the fact that the salt is not distributed over the upper surface continuously and homogenously.

With the expression "shelf-stable" referred to the focaccia of the invention it is understood here that the packaged focaccia can be stored at ambient temperature for at least 60 days, preferably at least 90 days, even more preferably at least 120 days.

With the expression "ready-to-eat" referred to the focaccia of the invention it is understood here that the focaccia of the invention is ready to be eaten without the need for any preparation step such as for example defrosting or baking.

The expression "upper surface" refers here to the surface which is exposed upwards during preparation and baking. The term surface, referred to the focaccia, refers here, again, to the upper surface, unless otherwise specified.

The focaccia of the present invention has a greater homogeneity of the content of water (or relative humidity) and value of water activity with respect to a fresh focaccia and of the prior art.

It was surprisingly found in fact that, thanks to this characteristic, but not only, the packaged focaccia of the present invention is able to sustain, unlike a fresh focaccia, a prolonged shelf life, at ambient temperature. More particularly, the focaccia of the present invention is preserved organoleptically and microbiologically for at least 60 days, preferably for 90 days, even more preferably for 120 days.

The step of filling the holes with saline solution, in particular, is crucial for the preservation, after the second leavening, of the holes obtained by the shaping performed following the first leavening.

The presence of olive oil in the shaping holes, as in the interior of the dough, in turn plays an important role in the control of the humidity of the product during baking and subsequently, by virtue of the result obtained, in the final product during its shelf life.

In addition to slowing down deterioration of the focaccia from the microbiological point of view, in fact, the high homogeneity of the humidity contributes to maintaining the focaccia soft, in every part thereof, throughout the aforesaid shelf-life, because the migration of the humidity, which is responsible for the deterioration of the texture of the traditional fresh focaccia, does not take place.

Unlike other types of focaccias, in fact, the focaccia of the present invention has a soft and non-crispy upper surface.

Another factor which may contribute to the prolonging of the time of maintenance of the softness of the focaccia over time is the optional presence of the aforesaid processing aid and/or emulsifier(s) (such as for example fatty acid mono- and diglycerides).

Moreover the particular profile of time, temperature and humidity adopted in the leavening steps c) and e), as well as the particular profile of time and temperature of the baking step g), have been optimised by the inventors to allow to obtain a focaccia having the desired consistency, humidity, flavour and appearance.

In the present invention, the process is such as to successfully obtain that the holes remain evident even after the leavening that follows the shaping, and after the subsequent baking of the focaccia. If a different sequence of steps of preparation of the focaccia and a different leavening profile were to be used, than those of the present invention, by omitting for example the step of filling of the holes with a saline solution, it could be that a leavening subsequent to the shaping would cause the swelling of the dough at the base of the holes, thus causing the loss of the holes themselves. In this case only small, barely visible holes would remain visible on the upper surface, which would not however confer the appearance of the typical focaccia which requires, instead, fully evident holes, with traces of oil. In this case moreover the perception of contrast between salty and less salty flavour typical of the focaccia would not be obtained because the saline solution would not be retained in the holes.

On the other hand, it would not be desirable to omit a leavening step subsequent to the shaping step because this would cause an excessive accumulation of dough at the holes, which would not be organoleptically acceptable.

The subsequent oiling of the upper surface, which ensures moreover the filling of the holes (the saline solution introduced previously will have been in fact absorbed following the second leavening, leaving the holes substantially empty) with oil, contributes to conferring a colour contrast between the browned surface of the focaccia and the lighter inside of the holes, and a desirable organoleptic effect because, as explained above, the presence of the saline solution first, and later of the oil, in the holes, contributes to the maintenance of an optimal distribution of the humidity in the focaccia during its preparation and during shelf-life, and upon tasting, a flavour contrast is experienced between the zones which comprise the holes, which are saltier, and those in which the hole is not present, which are less salty. The focaccia of the present invention therefore appears as a typical focaccia, with relatively deep holes, whiter in depth compared to the surface, and with traces of oil and saline solution in their inside.

Advantageously the focaccia of the present invention does not contain added sugars, usually used in the prior art for increasing the shelf life. The formulation of the present invention is in fact such that the desired preservation features are achieved without the need to resort to the addition of sugar. This is advantageous from the organoleptic point of view because, while it is known that sugar is a good preservative, it is also true that it gives an undesired taste to the focaccia.

DETAILED DESCRIPTION

Figure 1:
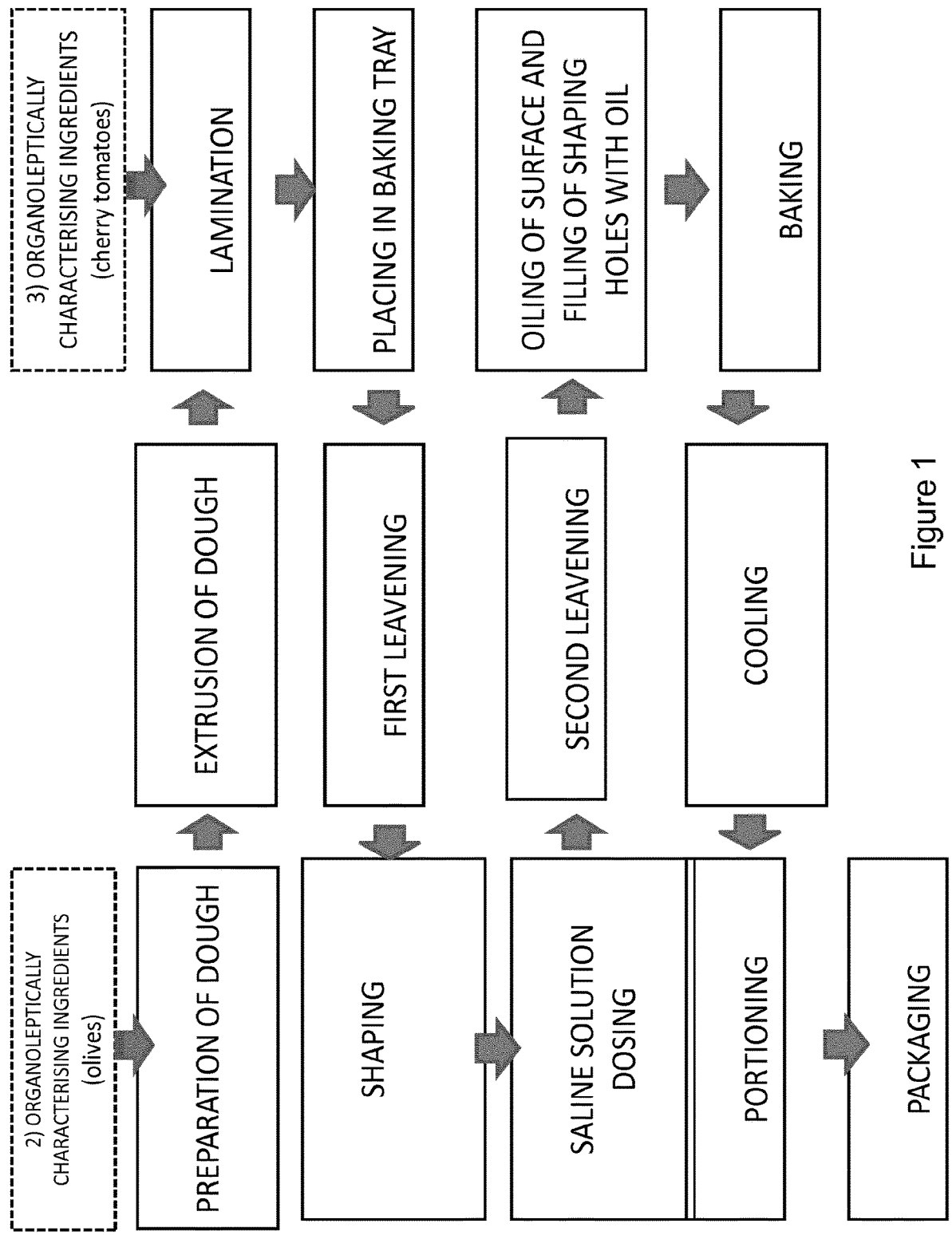
FIG. 1 shows a flow diagram summing up the process of the present invention according to three embodiments. The dotted boxes represent the optional steps of the second preferred embodiment (referred to by reference numeral 2) and of the third preferred embodiment (referred to by reference numeral 3) according to the present invention.

The present invention will be described further by referring to the exemplary embodiments given here below and with reference to FIGS. 1 and 2 by way of a non-limiting illustration.

Example 1

Plain Focaccia

In a first kneading step, a dough for focaccia was prepared with the ingredients given in Table 1, in the quantities indicated, in a mixer with spiral hook at a speed of the stirrer of 35 rpm for 5 minutes in environment set to a temperature of 25° C. To this, in a second kneading step, at 75 rpm for 7 minutes, the ingredients listed in Table 2 were then added in the quantities indicated. At the end a dough with total weight of 2.5 kg was obtained.

TABLE 1

Formulation of the dough of the first kneading step

| Ingredients | % based on the total |
|---|---|
| Type 0 wheat flour | 53.57 |
| Ascorbic acid | 0.05 |
| Malted barley flour | 0.38 |
| Gluten | 0.63 |
| Fatty acid monoglycerides | 0.40 |
| Water | 30.00 |
| Guar fibre | 0.91 |
| Powder natural yeast starter | 1.05 |
| Flavourings | 0.15 |
| Alpha-amylase | 0.02 |

TABLE 2

Ingredients added in the second kneading step

| Extra virgin olive oil | 1.46 |
|---|---|
| Palm fat | 8.05 |
| Natural yeast | 1.83 |
| Salt | 1.50 |

Total: 100%

The raw dough for focaccia thus obtained was subjected to an extrusion step with a model V4 extruder produced by Rheon Japan with "stress free" rollers in order not to cause mechanical damage, thus obtaining a continuous layer of the thickness of approximately 35 mm and width of 400 m. This continuous layer was then made to pass through a series of calibration rollers with the SM2 multi-roller "stretcher" apparatus produced by Rheon Japan, thus obtaining a sheet of dough of approximately 8 mm in thickness and 800 mm in width.

Four of the sheets thus obtained were superimposed one with the other in order to increase the elasticity of the dough and were then subjected to a lamination step in order to obtain a final thickness of 5 mm.

The dough thus obtained was portioned and cut for placing in the baking tray. The baking tray was with an edge on the four sides and was 25 mm deep.

A first leavening was then carried out, inserting the baking tray inside a thermostat-controlled cell at 25° C. for 30 minutes and at controlled relative humidity of 60%.

Upon leaving the cell the dough had a thickness of 6 mm and was subjected to a shaping step by means of the penetration in the dough of dedicated cylinders which form a series of blind holes of a depth of 5.5 mm with a device built ad hoc.

These holes were then filled with the dosing of a saturated saline solution of 35% salt in water (by weight based on the volume of the solution) in the amount of 0.1 g in each hole.

The dough was then subjected to a second leavening, inserting the baking tray inside a thermostat-controlled cell at 32° C. for 100 minutes and at controlled relative humidity of 85%.

On exiting the cell the dough had a thickness of 22 m.

The focaccia was then covered with approximately 150 ml (which corresponds to 5.6% of the total dough weight) of extra virgin olive oil on the upper surface and inside the holes.

The focaccia was then baked in a convection oven at an average temperature of 215° C. for 14 minutes. When the cooked focaccia exited the oven, the thickness of the focaccia was approximately 25 mm and the depth of the shaping holes was about 24 mm.

Within two minutes from exiting the oven the focaccia was removed from the baking tray and placed on a baking rack for about 30 minutes to cool.

Having reached the temperature of 30° C. the product was cut by ultrasounds and portioned into portions of 33 grams measuring 71×97 mm and the portions were packaged in a casing type packaging made with metallised film having air and light barrier properties after spraying ethyl alcohol at 1.4% on a wet basis.

Example 2

Olive Flavoured Focaccia with Olives

This focaccia was prepared by following the same process of Example 1 with the difference that in the first kneading step a dough was prepared based on the ingredients listed in Table 3. To this dough, the ingredients listed in Table 4 were added in the second kneading step.

TABLE 3

| Formulation of the dough of the first kneading step | |
|---|---|
| Ingredients | % based on the total |
| Type 0 wheat flour | 51.54 |
| Ascorbic acid | 0.05 |
| Malted barley flour | 0.36 |

TABLE 3-continued

| Formulation of the dough of the first kneading step | |
|---|---|
| Ingredients | % based on the total |
| Gluten | 0.61 |
| Fatty acid monoglycerides | 0.63 |
| Water | 24.70 |
| Guar fibre | 0.35 |
| Powder natural yeast starter | 1.01 |
| Flavouring | 0.21 |
| Alpha-amylase | 0.02 |

TABLE 4

| Ingredients added in the second kneading step | |
|---|---|
| Extra virgin olive oil | 1.41 |
| Palm fat | 4.23 |
| Natural yeast | 1.76 |
| Salt | 1.73 |
| Sliced frozen black olives | 11.39 |

Total: 100%

Upon the focaccia exiting the oven the thickness was approximately 25 mm and the depth of the shaping holes was approximately 24 mm.

At the end of baking and cooling on a baking rack, the product was cut by ultrasounds and portioned into portions of 35 grams measuring 71×97 mm and the portions were packaged in a casing type packaging made with metallised film having air and light barrier properties after spraying with ethyl alcohol at 1.4% on a wet basis.

Example 3

Tomato Flavoured Focaccia

This focaccia was prepared by following the same process of Example 1 with the difference that in the first kneading step a dough was prepared based on the ingredients listed in Table 5. To this dough, in the second kneading step, the ingredients listed in Table 6 were added, and with the difference that in the step of overlaying of the 4 sheets of dough a quantity of 8% by weight (with respect to the dough) of fragmented and IQF osmotically dehydrated cherry tomato was dosed between two sheets (see Table 7).

TABLE 5

| Formulation of the dough of the kneading step | |
|---|---|
| Ingredients | % based on the total |
| Type 0 wheat flour | 48.1 |
| Ascorbic acid | 0.06 |
| Malted barley flour | 0.69 |
| Gluten | 0.57 |
| Fatty acid monoglycerides | 0.46 |
| Water | 27.9 |
| Guar fibre | 0.83 |
| Powder natural yeast starter | 0.95 |
| Pizza flavouring | 0.05 |
| Alpha-amylase | 0.02 |

TABLE 6

Ingredients added in the second kneading step

| | |
|---|---|
| Extra virgin olive oil | 1.33 |
| Palm fat | 7.35 |
| Natural yeast | 2.05 |
| Salt | 1.64 |

TABLE 7

Ingredients added in the lamination step

| | |
|---|---|
| Fragmented and IQF osmotically dehydrated cherry tomatoes. | 8% |

Total: 100%

When the focaccia exited the oven the thickness was approximately 25 mm and the depth of the shaping holes was approximately 24 mm.

At the end of baking and cooling on a baking rack the product was cut by ultrasounds and portioned into portions of 35 grams measuring 71×97 mm and the portions were packaged in a bag type packaging made with metallised film having air and light barrier properties after spraying with ethyl alcohol at 1.4% on a wet basis.

Figure 2:
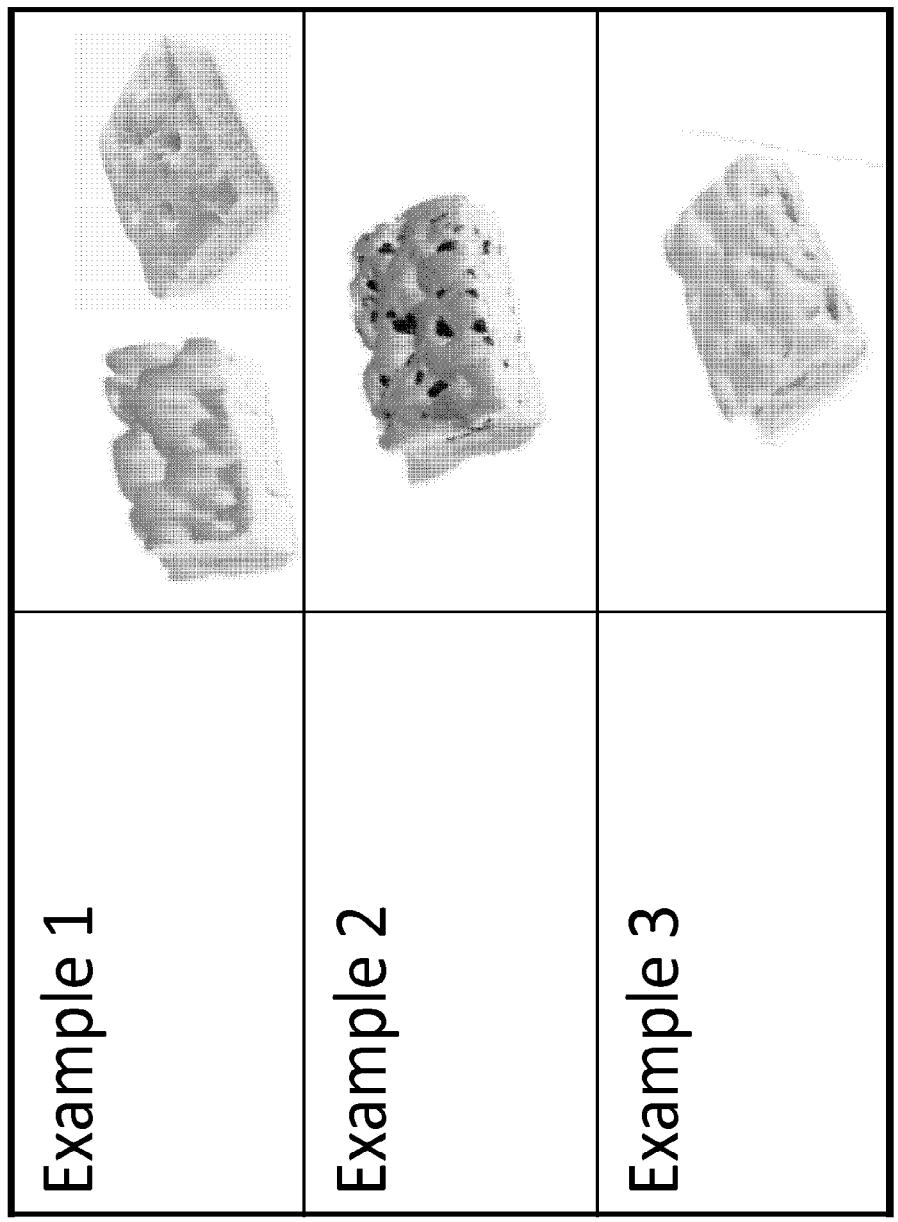
FIG. 2 shows photos of the three preferred embodiments according to Examples 1, 2 and 3, respectively.

FIG. 2 shows the appearance of the focaccias of the three examples. As can be seen the focaccia referred to as "Example 1" is a plain focaccia (without organoleptically characterising ingredients as defined here). The focaccia referred to as "Example 2" has pieces of olives distributed homogenously both on the surface and in the entire thickness of the focaccia. The focaccia referred to as "Example 3" shows the organoleptically characterising ingredient as defined here localised, in the form of a layer, mainly at the centre of the focaccia.

The three focaccias of the three examples were compared for some physical-chemical parameters immediately after packaging and after 120 days of storage at ambient temperature. In particular, the following were measured: relative humidity, water activity, pH, saturated and total fats content, salt content, resistance to compression in terms of hardness and recovery from deformation in terms of elasticity, colour, characterisation of the internal cells (size and shape by image analysis) and microbiological characteristics.

The pH was measured with a digital pH-meter at 20±2° C. with the potentiometric method. In order to measure the pH of the finished focaccia, the latter was ground finely, then homogenised and suspended at 10% in water, while stirring (UNI EN 1132 (February 1997)).

To measure hardness and elasticity an SMS texture analyser dynamometer (Stable Micro Systems) was used, fitted with a circular probe which lowers itself onto the sample, applying a load on the latter. The hardness and the elasticity are measured in the section comprised between the start of compression and 25% of the height of the sample following two actions of compression with a load of 25 kg in which the disk probe is 35 mm in diameter (1000 m²). The speed of compression is 1 mm/s. An associated software acquires the data and produces a load/displacement graph.

The software then calculates the resistance to compression (N) on the basis of the force exerted for the compression at 25% of displacement. The resistance (N) to compression (or hardness) is a measure of the structural hardness of the sample and is defined as the maximum peak force during the first cycle of compression.

The elasticity is, instead, a measurement of how much the sample recovers from the deformation both in terms of speed and derived forces. The latter parameter is calculated by the software as the ratio between the area 2 and the area 1, where the area 1 is calculated between the start of the first peak up to the maximum point and the area 2 from the maximum point up to the end of the peak.

This ratio is comprised between 0 and 1, in which a value closer to 1 indicates a more elastic sample.

The colour was measured with a photographic visual method and expressed in terms of temperature of colour (° K) which describes an empirical scale of light spectrum emitted by a certain illuminant, performed in defined light conditions. The values can vary from 2500-3500° K (red-yellow) and 7-8000° K (blue).

The characterisation of the dimensions and shape of the cells was performed by means of image analysis: an image analysis was performed at 256 levels of grey (Image Pro Plus software, Media Cybernetics, USA) on images of different slices of samples of the focaccia of the invention, following freezing, acquired at high resolution with optical scanner and appropriately processed (black/white conversion, increase in contrast, correction of the dynamic range and construction of a mask on the cells) to obtain the following measurements on the cells: area, average diameter, maximum diameter, minimum diameter, perimeter, roundness and fractal dimension. All these parameters were evaluated as a whole by means of the PCA multivariate statistical analysis (principal components analysis) with appropriate software (SIMCA, Umetrics, Sweden).

Tables 8-10 sum up the results of the measurements made:

TABLE 8

Physical-chemical measurements of the focaccia of Example 1 immediately after packaging and after 120 days of storage.

| Parameter | Immediately after packaging | After 120 days of storage |
|---|---|---|
| Humidity (%) | 27.0% | 27.0% |
| Water activity ($a_w$) | 0.89 | 0.89 |
| pH | 5.1 | 5.1 |
| Total fats content, of which saturated fats | 16.6% 5% | 16.6% 5% |
| Salt content | 2.0% | 2.0% |
| Resistance to compression | SMS hardness: 4.5N | SMS hardness: 5.5N |
| Recovery from deformation | SMS elasticity: 0.23 | SMS elasticity: 0.26 |
| Characterisation of cells | 9% cells: <10 pixels 69% cells: 10 < pixels < 100 20% cells: 100 < pixels < 1000 2% cells: >1000 pixels | 9% cells: <10 pixels 69% cells: 10 < pixels < 100 20% cells: 100 < pixels < 1000 2% cells: >1000 pixels |
| Colour | Digital photography with comparison method | Stable with respect to the digital photo taken immediately after packaging |
| Microbiological characteristics | Free from salmonella Total aerobic mesophilic bacterial load max. 500 ufc/g Total enterobacteria max. 10 ufc/g Yeasts and moulds max. 10 ufc/g | Free from salmonella Total aerobic mesophilic bacterial load max. 500 ufc/g Total enterobacteria max. 10 ufc/g Yeasts and moulds max. 10 ufc/g |

TABLE 8-continued

Physical-chemical measurements of the focaccia of Example 1 immediately after packaging and after 120 days of storage.

| Parameter | Immediately after packaging | After 120 days of storage |
|---|---|---|
| | Coagulase-positive staphylococci max. 5 ufc/g | Coagulase-positive staphylococci max. 5 ufc/g |

TABLE 9

Physical-chemical measurements of the focaccia of Example 2 immediately after packaging and after 120 days of storage.

| Parameter | Immediately after packaging | After 120 days of storage |
|---|---|---|
| Humidity (%) | 28% | 28% |
| Water activity ($a_w$) | 0.90 | 0.90 |
| pH | 5.4 | 5.4 |
| Total fats content, of which saturated fats | 15.7% 5% | 15.7% 5% |
| Salt content | 2.4% | 2.4% |
| Resistance to compression | SMS hardness: 6N | SMS hardness: 6.9N |
| Recovery from deformation | SMS elasticity: 0.25 | SMS elasticity: 0.29 |
| Characterisation of cells | 8% cells: <10 pixels 66% cells: 10 < pixels < 100 25% cells: 100 < pixels < 1000 1% cells: >1000 pixels | 8% cells: <10 pixels 66% cells: 10 < pixels < 100 25% cells: 100 < pixels < 1000 1% cells: >1000 pixels |
| Colour | Digital photography with comparison method | Stable with respect to the digital photo taken immediately after packaging |
| Microbiological characteristics | Free from salmonella Total aerobic mesophilic bacterial load max. 500 ufc/g Total enterobacteria max. 10 ufc/g Yeasts and moulds max. 10 ufc/g Coagulase-positive staphylococci max. 5 ufc/g | Free from salmonella Total aerobic mesophilic bacterial load max. 500 ufc/g Total enterobacteria max. 10 ufc/g Yeasts and moulds max. 10 ufc/g Coagulase-positive staphylococci max. 5 ufc/g |

TABLE 10

Physical-chemical measurements of the focaccia of Example 3 immediately after packaging and after 120 days of storage.

| Parameter | Immediately after packaging | After 120 days of storage |
|---|---|---|
| Humidity (%) | 28% | 28% |
| Water activity ($a_w$) | 0.88 | 0.88 |
| pH | 5.3 | 5.3 |
| Total fats content, of which saturated fats | 15% 4.2% | 15% 4.2% |
| Salt content | 2.2% | 2.2% |
| Resistance to compression | SMS hardness: 5.1N | SMS hardness: 5.8N |
| Recovery from deformation | SMS elasticity: 0.25 | SMS elasticity: 0.28 |
| Characterisation of cells | 9.5% cells: <10 pixels 70.5% cells: 10 < pixels < 100 19% cells: 100 < pixels < 1000 1% cells: >1000 pixels | 9.5% cells: <10 pixels 70.5% cells: 10 < pixels < 100 19% cells: 100 < pixels < 1000 1% cells: >1000 pixels |
| Colour | Digital photography with comparison method | Stable with respect to the digital photo taken immediately after packaging |
| Microbiological characteristics | Free from salmonella Total aerobic mesophilic bacterial load max. 500 ufc/g Total enterobacteria max. 10 ufc/g Yeasts and moulds max. 10 ufc/g Coagulase-positive staphylococci max. 5 ufc/g | Free from salmonella Total aerobic mesophilic bacterial load max. 500 ufc/g Total enterobacteria max. 10 ufc/g Yeasts and moulds max. 10 ufc/g Coagulase-positive staphylococci max. 5 ufc/g |

The focaccia of Example 1 has the following nutritional properties per 100 g: Energy 350 Kcal ca; proteins 8.1 g ca, carbohydrates 41 g ca, fats 16.6 g ca, fibres 3.8 g ca, salt 2.05 g ca.

The focaccia of Example 2 has the following nutritional properties per 100 g: energy 339 Kcalca; proteins 7.7 gca, carbohydrates 39.6 g ca, fats 15.7 gca, fibres 4.2 g ca, salt 2.4 gca.

The focaccia of Example 3 has the following nutritional properties per 100 g: energy 343 Kcal ca; proteins 7.7 g ca, carbohydrates 42.3 g ca, fats 15 g ca, fibres 4 g ca, salt 2.2 g ca.

The focaccia of the present invention therefore has organoleptic and appearance characteristics comparable to those of a fresh focaccia and exhibits evident shaping holes with depth of at least 50% of the thickness of the focaccia itself which have traces of salt and of oil.

Moreover the focaccia appears browned on the upper surface, with lighter zones (ivory colour) at the centre of the holes formed during the shaping step.

Upon tasting, the focaccia of the present invention is light and pleasantly oily, typical of fresh focaccias. The perception of saltiness alternates with that of less saltiness, typical of fresh focaccia. This sensation of dishomogeneous saltiness is guaranteed by the fact that in the focaccia of the present invention the saline solution is found at the shaping holes and not distributed homogenously and continuously on the entire upper surface. A sensation of light bitterness is also noted, given by the extra virgin olive oil. Upon chewing the focaccia is soft but not chewy.

As for the smell, the fragrance is discreetly intense, lightly persistent, without sweetish sensations, and is aromatic thanks to the olive oil. It also has aromas of bread or bread crust.

The focaccia of the present invention has a shelf life at ambient temperature of up to 120 days.

The focaccia of the present invention has the advantage of being ready to eat in that it has organoleptic and appearance characteristics comparable to those of a fresh focaccia without the need to heat it.

It therefore constitutes an excellent and practical snack to keep in a bag or in the office, and with the possibility of being eaten even when an equipped kitchen, and in particular an oven, is not available. Of course, the focaccia can also be eaten hot, but there is no need for this type of preparation.

By contrast, shelf-stable focaccias of the prior art are not suitable for being eaten directly from the packet, but require a preparation step, usually heating or cooking.

With the method of the present invention, a substantially homogenous upper surface of the focaccia and an homogenous thickness of the focaccia over the entire baking tray are obtained, such that in the case of portioning of the focaccia in a rectangular or square shape there are no trimmings (i.e. no waste) in that the entire content of a baking tray is cut and packaged. The process of the present invention therefore also has an advantage from the economic point of view in that no waste is produced.

The invention claimed is:

1. A process for the production of a ready-to-eat shelf-stable packaged focaccia, which process comprises the following series of steps:
   a) preparing a dough for focaccia comprising, by weight based on the total weight of the dough, 40-60% flour, 20-35% water, 7-16% vegetable oils and/or fats, of which 1-6% is extra virgin olive oil, 0.5-4% yeast, 0.1-3% salt, 0-15% at least one organoleptically characterising ingredient selected from the group consisting of a vegetable, a fruit, a spice, an aromatic herb, a cheese, a meat, a fish, and a cereal grain; 0-0.1% at least one baking processing aid selected from the group consisting of ascorbic acid and an enzyme-based baking improver, 0-0.8% at least one emulsifier and 0-1.5% dietary fibres;
   b) extruding the dough thus prepared in step a) to obtain a plurality of sheets of extruded raw dough for focaccia, and subsequently laminating said plurality of sheets of raw dough for focaccia thus obtaining a layer of laminated raw dough for focaccia;
   c) first leavening said layer of laminated raw dough for focaccia thus obtained in step b) at a temperature between 20 and 30° C.;
   d) shaping the layer of raw leavened dough for focaccia thus obtained in step c) and forming a plurality of blind holes on the surface of the dough and filling said holes with a saline solution;
   e) second leavening the raw dough thus obtained in step d) at a temperature comprised between 30 and 37° C.;
   f) oiling the upper surface of the dough thus obtained in step e) and filling said holes with oil;
   g) baking the raw dough thus obtained in step f) in an oven at a temperature comprised between 210 and 240° C. to obtain the focaccia; and
   h) packaging the focaccia thus obtained in step g), wherein the focaccia has relative humidity comprised between 25 and 32%, and water activity ($a_w$) comprised between 0.85 and 0.92, and wherein the humidity and the water activity are homogenous throughout the focaccia.

2. The process according to claim 1, wherein said step a) comprises kneading the dough and comprises a first step wherein said flour, water, said optional at least one baking processing aid, said optional at least one emulsifier and/or said optional dietary fibres and said optional at least one organoleptically characterising ingredient are mixed; and a second step wherein said vegetable oils and/or fats, yeast and salt are introduced into the dough thus formed.

3. The process according to claim 1, wherein said step b) of extruding and laminating is carried out with a passage of said dough in a stress free roller extruder thus obtaining a continuous layer of extruded raw dough, followed by the passage of said layer of extruded raw dough through a series of calibration rollers thus obtaining a sheet of extruded raw dough.

4. The process according to claim 3, wherein said step b) of extruding and laminating involves the superimposition of from 2 to 8 of said sheets of extruded raw dough, thus obtaining a layer of laminated raw dough for focaccia with total thickness of 4-7 mm.

5. The process according to claim 3 wherein said step b) of extruding and laminating comprises a step of dosing of said at least one organoleptically characterising ingredient in a quantity comprised between 5 and 15% between two extruded sheets of raw dough for focaccia.

6. The process according to claim 5, wherein said organoleptically characterising ingredient is tomato.

7. The process according to claim 1, wherein said step c) of first leavening is carried out for a time between 25 and 35 minutes, at a temperature between 20 and 30° C., and a relative humidity between 55 and 65%.

8. The process according to claim 1, wherein said step d) of shaping is carried out by poking said dough by means of a plurality of cylinders.

9. The process according to claim 1, wherein said saline solution comprises from 25% by weight of salt based on the volume of the solution to saturation.

10. The process according to claim 9 wherein said saline solution is saturated and comprises about 35% by weight of salt based on the volume of the solution.

11. The process according to claim 1, wherein said step e) of second leavening is carried out for a time between 80 and 130 minutes, at a temperature between 30 and 37° C., and a relative humidity between 80 and 95%.

12. The process according to claim 1, wherein in said step g) of baking, the oven is of the convection type and the baking is carried out for a time between 13 and 19 minutes, at a temperature between 210 and 240° C.

13. The process according to claim 1, wherein said focaccia has a non-crispy surface.

* * * * *